United States Patent [19]

Tiru et al.

[11] Patent Number: 4,743,557
[45] Date of Patent: May 10, 1988

[54] COMPOSITION HAVING REGULATED OCCURENCE OF OPACITY AND CLARITY AT SELECTED TEMPERATURES AND METHOD OF MAKING THE SAME AND ALSO USE OF THE COMPOSITION

[76] Inventors: Maj-Britt I. Tiru; Mandayam O. Tiru, both of Avstyckningsv. 86, Järfälla, Sweden, S-17543

[21] Appl. No.: 873,290

[22] Filed: Jun. 5, 1986

Related U.S. Application Data

[63] Continuation of Ser. No. 587,679, filed as PCT SE83/00237, Jun. 8, 1983, published as WO84/00212, Jan. 19, 1984, abandoned.

[30] Foreign Application Priority Data

Jul. 2, 1982 [SE] Sweden .............................. 820/4093

[51] Int. Cl.$^4$ ............................................ G01K 11/12
[52] U.S. Cl. ........................................ 436/2; 116/207;
116/216; 252/408.1; 422/61; 436/20; 436/147;
374/161
[58] Field of Search ............................ 422/61; 426/88;
116/216, 207; 252/408.1, 962; 436/2, 20, 147;
374/167, 162

[56] References Cited

U.S. PATENT DOCUMENTS

| 1,374,857 | 4/1921 | Linebarger | 374/141 |
|---|---|---|---|
| 1,777,353 | 10/1930 | Davis | 374/162 |
| 2,261,473 | 11/1941 | Jennings | 436/7 |
| 3,935,384 | 1/1976 | Jirka | 358/166 |
| 4,070,912 | 1/1978 | McNaughtan | 116/216 |
| 4,148,748 | 4/1979 | Hanlon et al. | 116/216 |
| 4,149,852 | 4/1979 | Tiru et al. | 252/408.1 |
| 4,150,572 | 4/1979 | Lindquist | 116/207 |
| 4,169,661 | 10/1979 | Yamada et al. | 350/353 |
| 4,260,225 | 4/1979 | Walles | 350/353 |
| 4,268,413 | 5/1981 | Dabisch | 116/216 |
| 4,299,727 | 11/1981 | Hof et al. | 252/408.1 |
| 4,428,321 | 1/1984 | Arens | 426/88 |
| 4,457,253 | 7/1984 | Manske | 116/216 |

FOREIGN PATENT DOCUMENTS

| 702000 | 1/1954 | United Kingdom . |
| 1138590 | 1/1969 | United Kingdom . |
| 1153959 | 6/1969 | United Kingdom . |
| 1161039 | 8/1969 | United Kingdom . |

OTHER PUBLICATIONS

Langes Handbook of Chemistry Table 7-4, #1481, 5022, 3950, 1979.

Primary Examiner—S. Leon Bashore
Assistant Examiner—K. M. Hastings
Attorney, Agent, or Firm—Finnegan, Henderson, Farabow, Garrett & Dunner

[57] ABSTRACT

A composition having regulated occurrence of opacity and clarity at selected temperatures; method of making and using such a composition to create a temperature-indicating device by filling the composition in a suitable container of transparent material and having a background in the form of a color, a letter or a number i.e., in order to be able to visually interpret the difference between opacity and clarity. A reversible indicating device is made which can show if the upper or lower limits of a pre-set temperature interval has been exceeded or fallen below.

21 Claims, 1 Drawing Sheet

U.S. Patent May 10, 1988 4,743,557
REFRIGERATION TEMPERATURE INDICATOR
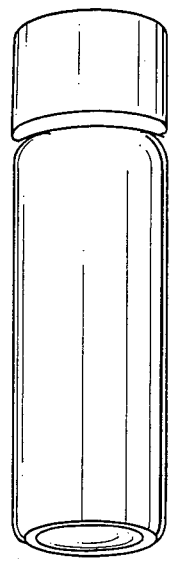
MILKY WHITE OR OPAQUE
BELOW +8°C
CONTENTS CLEAR
ABOVE +11°C

COMPOSITION HAVING REGULATED OCCURENCE OF OPACITY AND CLARITY AT SELECTED TEMPERATURES AND METHOD OF MAKING THE SAME AND ALSO USE OF THE COMPOSITION

CROSS-REFERENCE TO RELATED APPLICATION

This application is a continuation of application Ser. No. 587,679, filed as PCT SE 83/00237, June 8, 1983, published as WO 84/00212, Jan. 19, 1984, now abandoned.

BACKGROUND OF THE INVENTION

This invention relates generally to a composition where the occurrence of opacity or clarity is regulated to occur to selected temperatures, and a method to make such a composition. It is the purpose of this invention to develop and use new compositions for temperature indication between −150° C. and +250° C. In addition the invention aims to create a composition which will indicate when either over- or under-exposure to a related temperature range has occurred. Such a reaction occurs in a reversible way in order that one may take corrective action.

Recommended storage temperatures for food, medicines, biological products, etc. are always related to conditions ideal for safeguarding the stability of the products. Such products should be stored in such a way that the initial quality may be satisfactorily preserved until they are used or consumed. Some products are to be neither frozen nor warmed up above a certain temperature during the storage period. For instance, a number of vaccines are recommended to be stored between +2° C. and +8° C. These preparations, in addition, should not be frozen. Packages of dairy products and meat products are stored in the refrigerator at temperatures with a recommendation that such products should not be exposed to temperatures higher than, for example, +8° C. Even if there would be no direct danger to the quality of the products when stored wrongly for a short time, it is obvious that prolonged storage or handling under unfavourable temperature conditions would naturally harm or deteriorate the products quality. It is, therefore, of importance to have an instrument which can easily indicate such wrong handling in order that one may take corrective action so as to avoid quality deterioration. Other fields of application lie in other temperature regions, for instance, green, fruits, flowers etc.—products all of which are sensitive to freezing. It is the aim of the invention to adjust to a product's ideal storage temperature range and by an easily observable way to show if the product is correctly stored.

SUMMARY OF THE INVENTION

A change from opacity to clarity can occur when a first substance with higher melting point goes into solution in a second component with lower melting point, or when a substance melts. By using a background in the form of, for instance, a colour, a number or a letter, it is easy to visually observe the change between opacity and clarity (i.e. from opaque to transparency). Such a composition can be stored in a suitable container made of transparent plastic, glass or the like. The term "opacity" is used to denote any change from transparency to opalescense, cloudiness, turbidity or precipitationall which tend to obscure visual observation of a background viewed through the composition thus tending to make it opaque and no longer transparent.

In this invention, with the aid of several experiments, it was found that one could regulate the change between opacity to clarity to a narrow temperature range of +0.5° C. One could further improve upon this by choosing the second component with altered melting point or solubilizing property. Conversely, one may also delay the change from opacity to clarity by choosing a mixture of liquids as the second component having different solubilizing properties. By the addition of surface active agents such as Tween ®, the particle size or degree of aggregation is apparently diminished when opacity appears. In consequence, the particles go more readily into solution when the temperature is raised.

In addition, it has been found in this invention, that by changing the relative concentration of the first component, one obtains an increase or decrease of the temperature interval between the formation of opacity on the one hand and the disappearance of opacity to give a clear solution on the other. In this way a composition with different desired temperature intervals can be created, especially to suit a product which has to be guarded or protected. Thus, one can both indicate using the same composition if underexposure to the recommended lower temperature has occurred, when a change from clearness to opacity takes place, and if over exposure to the recommended maximum temperature has occured, when a change from opacity to clearness is observed. By filling the same composition into two transparent containers one with a clear solution with green background for example, and the other with the solution previously exposed to lower temperature in order to cause a turbidity and having a background for instance in red colour—which is not noticeable due to the opacity of the solution, one can watch if temperature conditions within the recommended range has been maintained. Underexposure will cause opacity to appear and the green colour would no longer be visible. Overexposure will cause the opaque solution to clear leaving the red colour visible.

By choosing appropriate components, one can further expand or diminish the temperature range or interval between formation of opacity and its conversion to clarity. As will be readily noticed from the following examples, (table 12), one can obtain a temperature interval of as large as 47° C. A number of other substances not included here have also given such temperature intervals and with higher stability during repeated usage. Although the reaction is reversible, they could be apparently used as non-reversible reactions for practical purposes either to indicate as a freeze watch alarm or high temperature alarm, which could be reset for repeated use.

BRIEF DESCRIPTION OF THE DRAWING

This invention will be more fully understood by reference to the drawing in which:

The FIGURE is an article of manufacture comprising a sealed compartment containing a composition of the invention.

DETAILED DESCRIPTION

Practically every chemical or combination of chemical substances which cause opacity on falling out of solution at certain temperatures could be used in this invention. Aliphatic or aromatic hydrocarbons, alcohols, ketones, esters, acids and ethers are especially preferred. Even pigments can function as the main or as subcomponents in the system in order to improve on the visual indication.

For the practice of the principle of this invention, one chooses the first component among chemicals which have a melting-point at a temperature higher than the temperature region which has to be guarded, and the second component from among chemicals with a melting-point at a temperature lower than the lowest temperature, which has to be watched. This in principle means that with reference to the temperature region which has to be watched or indicated, one chooses a solid at such temperature regions as the first component and a liquid as the second component, whereby the liquid acts as a solvent to the solid material.

A full list of chemicals having various melting-points can be obtained in Handbooks of Chemistry and Physics, Langes Handbook of Chemistry (ED J. A. Dean 1972) etc. In principle all such chemicals can be utilized in this invention.

In order readily to understand the principle of the invention, the following examples are outlined.

EXAMPLE 1

This example shows how varying concentrations of palmitic acid (component I) in different alcohols (component II) influences the temperature-related appearance of opacity and clearing of such opacity. From table 1, it is also readily seen that increasing concentration of palmitic acid diminishes the temperature interval between opacity formation and clarity.

EXAMPLE 2

Table 2 shows how different concentrations of stearic acid (component I) in different solvents (component II) affect the temperature limits for opacity formation and clarity. Opacity appears at lower temperatures with stearic- than with palmitic acid.

EXAMPLE 3

Considerably lower temperatures are noticed for opacity formation and clarity with fatty acids such as lauric acid when used as component I. The temperature when opacity occurs lies in the minus temperature range even with 10 percent concentration. The results are shown in table 3.

EXAMPLE 4

Results of experiments done using tripalmitin as component I in different alcohols (component II) are shown in table 4. Higher temperatures and larger ranges between opacity formation and clarity are noticed, compared with examples 1, 2 and 3.

EXAMPLE 5

In table 5 are shown the results using trimyristin instead of tripalmitin. Opacity and clarity occurs at somewhat lower temperatures with trimyristin than tripalmitin. In this way other esters with lower or higher melting points as component I and different solvents with variable solubilizing properties as component II can be used to obtain the desired temperature ranges for visual observation.

EXAMPLES 6, 7, 8 and 9

These examples indicate how aliphatic alcohols, like cetyl alcohol (table 6), stearyl alcohol (table 7), 1-dodecanol (table 8) and n-decyl alcohol (table 9) can be used with advantage to indicate temperature ranges even in the minus region.

EXAMPLE 10

Cholesterol is another substance which can be used as component I. In 2-propanol it forms a gel and translucent, whereas opacity is noticed with 1-propanol. The results obtained are given in table 10.

EXAMPLE 11

Benzoic acid of 10 percent concentration gives relatively low temperature for opacity formation in the three different solvents studied. As can be seen in table 11, a 20 percent benzoic acid solution in 2-propanol shows opacity at $-12°$ C., in 1-propanol $±0°$ C. and in 1-hexanol $+7°$ C. and clarity at $+5°$ C., $+11°$ C. and $+14°$ C. in the respective solvents. Thus, the composition using 2-propanol gives the largest temperature interval for opacity formation and clearance.

EXAMPLE 12

Like cholesterol, naphthalene compounds can be used as component I. Table 12 shows the results using 1-naphthol. A rather high concentration of 1-naphthol as component I is needed to show a desirable opacity with methanol as solvent. About 60 per cent 1-naphthol shows opacity formation at $-12°$ C. which clears at $+12°$ C. With 2-propanol as solvent, the same concentration gives opacity formation at $-12°$ C. whereas clearance takes place at $+35°$ C., a temperature range of $47°$ C.

EXAMPLE 13

Some of the hydrocarbons which also give a turbidity or precipitation can also be used as component I. In table 13 are outlined the results when using n-dodecane, n-hexadecane and n-eicosane. These substances do not show any great variation in temperature range between opacity formation and clarity when the concentration is changed from 50 to 25 percent in methanol used as component II.

The examples 1-13 clearly show how the invention can be used to obtain a composition to indicate the desired temperature levels and range. Different substances give rise to different degrees of opacity so that one may choose the appropriate composition of desired volume or thickness of the container used. In this way, compositions of desired sensitivity can be made. Practical application of the invention is outlined by the following examples.

EXAMPLE 14

Let us assume that a product has to be cooled to and maintained at $-20°$ C. Before use it should be raised to $-6°$ C. A composition is needed first to indicate that the temperature of $-20°$ C. has been attained and at the same time indicate when the temperature is raised to $-6°$ C. In a container of transparent plastic vial of height 2 cm and diameter 1 cm, the bottom is painted with a green shining colour. The container is filled with a composition containing 50 percent decanol in methanol. The colour at the bottom can now be readily observed through the transparent lock. When the container is cooled down to $-20°$ C., opacity appears, the composition becomes white and green colour is no longer visible. When the temperature is raised to $-6°$ C. the composition clears up and the green colour is again visible. In this way, the temperature and temperature-range requirement can be fulfilled.

EXAMPLE 15

A simple indicating device to control if refrigerator temperatures are correctly maintained can be in the following way. A glass tube is filled with a composition containing 5 percent cetylalcohol in 2-propanol. A background in the form of a strip, painted with a fluorescent or luminescent colour is affixed to the tube. The background colour is readily visible to the naked eye. When the temperature of +1° C. is reached, opacity begins to appear and the background colour is no longer visible. As long as the temperature is below +8° C. the composition shows an opacity which is white all along the tube. If at any place the temperature exceeds +8° C., the opacity disappears and the background colour becomes visible. Thus, by having a long tube filled with the composition and extending from the top to the bottom of the refrigerator, one can readily observe at which level—or levels, due to bad packing or cooling effects—the temperature is above +8° C. in order to take corrective action.

EXAMPLE 16

A similar arrangement according to example 15 but using a composition containing 1.5 percent stearic acid in methanol which gives opacity at temperatures below zero (for instance −10° C.) but clearance at +10° C. one can make an apparently irreversible indicating device which would show that the recommended maximum temperature of +10° C. has been exceeded. In this event, the tube must be removed and reactivated (i.e. to obtain opacity) by exposing to low temperatures for instance in a deep freeze or cryostat.

EXAMPLE 17

An arrangement similar to example 15 but containing a composition consisting of 6 percent trimyristin in ethanol, can also be placed in bacteriological incubators where the temperature has to be maintained strictly around +37° C. Temperatures above +45° C. for instance may kill many microorganisms whereas temperatures below +30° C. may not be conducive to their growth. Two tubes containing the same composition, one showing opacity with a background of red colour or other indication, and the other being clear with a green or similar background—as an "okay signal"—are placed vertically in the incubator. These two tubes show respectively by changing from green to white colour (indicative of having reached below +30° C.) and by white to red colour (indicative of being exposed to over +45° C.) if the incubator temperature requirements have not been complied with.

EXAMPLE 18

Examples 1–17 indicate how different components can give opacity and clarity in organic solvents. This same phenomenon can also be observed using water as solvent. In addition the freezing temperature of water can be readily lowered by adding different salts. A large number of components which are easily soluble in water but which give a turbidity or opacity can be used in the invention. Phenolphtalein at pH 8.0, many salts or fatty acids, etc. are usable as component I. Addition of surface active agents such as Tween ® or Triton ® or others give rise to a fine opacity which readily redissolves to a clear solution on rewarming.

The invention's main principle is based on two components, where the first component, a solid, dissolves in the second component, a liquid, at a particular temperature. When the temperature is lowered, opacity appears. The composition becomes clear when the temperature is again raised. Generally the component I should have a melting point higher than component II, because the composition is in the liquid state when opacity appears. The components can also consist of mixtures of substances in order to improve upon the observation made by visible means such as using a colour dye or pigment in addition to the main component or a mixture of solvents as component II in order to improve or delay the temperature at which opacity appears or clears up, as well as to modify the temperature range needed. In this invention a large number of other substances may also function, having no definite melting point, substances which get destroyed instead on exposure to certain temperatures. Examples of such substances are sugars, starches, proteins, salts, etc. A possible explanation of the phenomenon of opacity formation on lowering the temperature can be that the system exceeds a saturation point. The addition of surface active agents helps in improving on the fineness of particles, which results in narrowing the temperature limit when the composition goes from opacity to clarity on rewarming. Although the relation between temperature and saturation point for a large number of chemicals are generally known, it had been difficult so far to apply the principle to create temperature indication systems with the help of a saturated solution using a solid substance. That there is a relation between temperature interval between opacity and clarity on the one hand, and concentration of the solid substance on the other, is exemplified in the present invention. This has previously not been described as usable for temperature-range monitoring. British Pat. No. 702,000 describes on page 1 lines 13–32 the difficulties in using a system of saturated solution of camphor in dilute alcohol. For this reason, many have turned to temperature indication using only liquids (Brit. Pat. No. 702,000, Japanese Pat. No. 52-45989, U.S. Pat. No. 1,374,857), where the miscibility is reduced either at high or low temperatures. The difficulties with liquids has further been that they separate into two layers. As such opacity which is formed just at the time of separation becomes clear again on further lowering of temperature due to separation of the liquids. One has attempted to delay or hasten such separation by choosing liquids of right viscosity or specific gravity, as well as by adding a third vehicle to the system. None of these cited literature aim to obtain a temperature range nor do they fulfill the criteria for component I, the substance which causes opacity on falling out of solution and which is a solid, i.e. having a melting point higher than the indicating temperature region.

To distinguish between the phase variations based mainly on changes in melting-point of a substance, a temperature variation of only between 2° C. and 3° C. is obtained, depending upon the purity of the chemical as well as its stability during repeated usage. Belgian Pat. No. 770 290 describes how one may obtain a series of compounds with definite melting points by mixing two substances of different melting points (eutectic mixtures). This same principle is also described in the German Pat. No. 2310457. A certain difficulty is encountered due to supercooling and the temperature for renewed conversion to solid from the molten state is often changed. Swedish Pat. No. 404963, describes just how to prevent such supercooling by adding substances like anthraquinone. These citations do not give any measurement of temperature ranges as described in this invention.

Other techniques described in the literature for temperature measurement relate to the use of liquid crystals (Brit. Pat. Nos. 11 38 590, 11 53 959, 11 61 039) or by using pH-indicators which indicate changes in hydrogen ion concentration when chemicals melt or solutions freeze (Swedish Pat. No. 76 05 338, U.S. Pat. No. 2,261,473). Thus the present invention is different from the previously used methods for temperature measurement and temperature range indication. The composition of the invention can be used to make a temperature indicating device, such as the device in the FIGURE, wherein the composition is enclosed in a suitable transparent or translucent container made, for instance of glass, plastic or the like, and with a background in the form of, for instance, a color, a number or a letter, which makes it possible visually to distinguish the difference between opacity and clarity.

TABLE 1

| Component II | Palmitic acid (component I) % conc. w/v | | | | | |
|---|---|---|---|---|---|---|
| | 1.25 | 2.5 | 5 | 10 | 20 | 50 |
| | Temp. °C. | | | | | |
| Methanol | | | | | | |
| Opacity | +6 | +13 | +19 | +25 | +31 | |
| Clarity | +34 | +26 | +29 | +34 | +36 | |
| Temp. interval | 17 | 13 | 10 | 9 | 5 | |
| Ethanol | | | | | | |
| Opacity | −2.5 | +2 | +10 | +19 | +27 | |
| Clarity | +10 | +13 | +17 | +25 | +31 | |
| Temp. interval | 12.5 | 11 | 7 | 6 | 4 | |
| 1-Propanol | | | | | | |
| Opacity | −8.5 | ±0 | +7 | +17 | +26 | |
| Clarity | +6 | +11 | +16 | +23 | +30 | |
| Temp. interval | 14.5 | 11 | 9 | 6 | 4 | |
| 2-Propanol | | | | | | |
| Opacity | −8.5 | ±0 | +7 | +17 | +26 | |
| Clarity | +6 | +11 | +16 | +24 | +30 | |
| Temp. interval | 14.5 | 11 | 9 | 7 | 4 | |

TABLE 2

| Component II | Stearic acid (component I) % Conc. w/v | | | | | |
|---|---|---|---|---|---|---|
| | 1.25 | 2.5 | 5 | 10 | 20 | 50 |
| | Temp. °C. | | | | | |
| Methanol | | | | | | |
| Opacity | −10 | −2 | +9 | +18 | +26 | |
| Clarity | +10 | +20 | +28 | +32 | +35 | |
| Temp. interval | 20 | 22 | 19 | 14 | 9 | |
| Ethanol | | | | | | |
| Opacity | −6 | +2 | +9 | +18 | +24 | |
| Clarity | +6 | +12 | +22 | +24 | +30 | |
| Temp. interval | 12 | 10 | 13 | 6 | 6 | |
| 1-Propanol | | | | | | |
| Opacity | −12 | −4.5 | +5 | +14 | +21 | |
| Clarity | +3 | +7 | +13 | +19 | +26 | |
| Temp. interval | 15 | 11.5 | 8 | 5 | 5 | |
| 2-Propanol | | | | | | |
| Opacity | −14 | −7 | +2 | +14 | +21 | |
| Clarity | +2 | +5 | +11 | +19 | +26 | |
| Temp. interval | 16 | 12 | 9 | 5 | 5 | |

TABLE 3

| Component II | Lauric acid (component I) % Conc. w/v | | | | | |
|---|---|---|---|---|---|---|
| | 1.25 | 2.5 | 5 | 10 | 20 | 50 |
| | Temp. °C. | | | | | |
| Methanol | | | | | | |
| Opacity | <−17 | −16 | −14 | −6 | +2 | +17 |
| Clarity | | +3 | +2 | +3 | +7 | +21 |
| Temp. interval | | 19 | 16 | 9 | 5 | 4 |
| Ethanol | | | | | | |
| Opacity | <−17 | <−17 | −16 | −10 | +2 | +18 |
| Clarity | | | −4 | ±0 | +7 | +22 |
| Temp. interval | | | 20 | 10 | 5 | 4 |
| 1-Propanol | | | | | | |
| Opacity | <−17 | <−17 | <−15 | −11 | ±0 | +21 |
| Clarity | | | | +0 | +7 | +24 |
| Temp. interval | | | | 11 | 7 | 3 |
| 2-Propanol | | | | | | |
| Opacity | <−17 | −16 | — | −12.5 | −3 | +20 |
| Clarity | | +3 | | +2 | +5 | +25 |
| Temp. interval | | 19 | | 14.5 | 8 | 5 |
| 1-Pentanol | | | | | | |
| Opacity | | <−20 | <−20 | −17 | ±0 | |
| Clarity | | | | +0 | +10 | |
| Temp. interval | | | | 17 | 10 | |
| 1-Hexanol | | | | | | |
| Opacity | | <−20 | <−20 | −18 | ±0 | |
| Clarity | | | | −4 | +10 | |
| Temp. interval | | | | 14 | 10 | |
| 2-Octanol | | | | | | |
| Opacity | | <−24 | <−24 | −18 | +2 | |
| Clarity | | | | −4 | +10 | |
| Temp. interval | | | | 14 | 8 | |

TABLE 4

| Component II | Tripalmitin (Component I) % conc. w/v | | | | | |
|---|---|---|---|---|---|---|
| | 1.25 | 2.5 | 5 | 10 | 20 | 50 |
| | Temp. °C. | | | | | |
| Methanol | | | | | | |
| Opacity | — | — | +35 | +53 | | +60 |
| Clarity | — | — | +60 | +61 | | +66 |
| Temp. interval | | | 25 | 8 | | 6 |
| Ethanol | | | | | | |
| Opacity | — | — | +34 | +35 | | +42 |
| Clarity | — | — | +58 | +58 | | +63 |
| Temp. interval | | | 24 | 23 | | 21 |
| 1-Propanol | | | | | | |
| Opacity | — | +25 | +37 | +46 | | +48 |
| Clarity | — | +50 | | +55 | | +56 |
| Temp. interval | | 25 | | 9 | | 8 |
| 2-Propanol | | | | | | |
| Opacity | — | +40 | +42 | +46 | | +48 |
| Clarity | — | +55 | +55 | +55 | | +55 |
| Temp. interval | | 15 | 13 | 9 | | 7 |

TABLE 5

| Component II | Trimyristin (component I) % conc. w/v | | | | | |
|---|---|---|---|---|---|---|
| | 1.25 | 2.5 | 5 | 10 | 20 | 50 |
| | Temp. °C. | | | | | |
| Ethanol | | | | | | |
| Opacity | — | — | +29 | +26 | | +29 |
| Clarity | — | — | +45 | +45 | | +45 |
| Temp. interval | | | 16 | 19 | | 16 |
| 1-Propanol | | | | | | |
| Opacity | — | — | +28 | +29 | | +35 |
| Clarity | — | — | +38 | +44 | | +46 |
| Temp. interval | | | 10 | 15 | | 11 |
| 2-Propanol | | | | | | |
| Opacity | — | — | — | +33 | | +32 |
| Clarity | — | — | — | +44 | | +45 |

TABLE 5-continued

| | Trimyristin (component I) % conc. w/v | | | | | |
|---|---|---|---|---|---|---|
| | 1.25 | 2.5 | 5 | 10 | 20 | 50 |
| Component II | Temp. °C. | | | | | |
| Temp. interval | | | | | 11 | 13 |

TABLE 6

| | Cetyl alcohol (component I) % Conc. w/v | | | | | |
|---|---|---|---|---|---|---|
| | 1.25 | 2.5 | 5 | 10 | 20 | 50 |
| Component II | Temp °C. | | | | | |
| Methanol | | | | | | |
| Opacity | +2 | +7.5 | +13 | +18.5 | +21 | |
| Clarity | +9 | +13.5 | +19 | +22 | +24 | |
| Temp. interval | 7 | 6 | 6 | 3.5 | 3 | |
| Ethanol | | | | | | |
| Opacity | −7 | +1 | +7.5 | +13.5 | +17.5 | |
| Clarity | +2 | +6 | +11 | +17 | +21 | |
| Temp. interval | 9 | 5 | 3.5 | 3.5 | 3.5 | |
| 1-Propanol | | | | | | |
| Opacity | −14 | −8 | ±0 | +8 | +16 | |
| Clarity | −5 | +1 | +8 | +12 | +19 | |
| Temp. interval | 9 | 9 | 8 | 4 | 3 | |
| 2-Propanol | | | | | | |
| Opacity | −16 | −7 | +1 | +9 | +15 | |
| Clarity | −3 | +1 | +8 | +13 | +19 | |
| Temp. interval | 13 | 8 | 7 | 4 | 4 | |

TABLE 7

| | Stearyl alcohol (component I) % Conc. w/v | | | | | |
|---|---|---|---|---|---|---|
| | 1.25 | 2.5 | 5 | 10 | 20 | 50 |
| Component II | Temp °C. | | | | | |
| Methanol | | | | | | |
| opacity | +11 | +16 | +23 | +28 | +32 | |
| Clarity | +20 | +24 | +28 | +32 | +35 | |
| Temp. interval | 9 | 8 | 5 | 4 | 3 | |
| Ethanol | | | | | | |
| Opacity | ±0 | +8 | +15 | +22 | +26 | |
| Clarity | +10 | +15 | +20 | +26 | +32 | |
| Temp. interval | 10 | 7 | 5 | 4 | 6 | |
| 1-Propanol | | | | | | |
| Opacity | −4 | +5 | +12 | +20 | +26 | |
| Clarity | +8 | +13 | +18 | +24 | +29 | |
| Temp. interval | 12 | 8 | 6 | 4 | 3 | |
| 2-Propanol | | | | | | |
| Opacity | −4 | +3 | +11 | +18 | +26 | |
| Clarity | +9 | +12 | +19 | +24 | +29 | |
| Temp. interval | 13 | 9 | 8 | 6 | 3 | |

TABLE 8

| | Dodecanol (component I) % conc. w/v | | | | | |
|---|---|---|---|---|---|---|
| | 1.25 | 2.5 | 5 | 10 | 20 | 50 |
| Component II | Temp. °C. | | | | | |
| Methanol | | | | | | |
| Opacity | <−17 | <−17 | <−17 | −11 | −7 | +2 |
| Clarity | | | | −8 | −4 | +4 |
| Temp. interval | | | | 4 | 3 | 2 |
| Ethanol | | | | | | |
| Opacity | <−17 | <−17 | <−17 | −14 | −11 | +3 |
| Clarity | | | | −10 | −6 | +4.5 |
| Temp. interval | | | | 4 | 5 | 1.5 |
| 1-Propanol | | | | | | |
| Opacity | <−17 | <−17 | <−17 | <−17 | −13 | +4 |
| Clarity | | | | | −9 | +7 |
| Temp. interval | | | | | 4.5 | 3 |
| 2-Propanol | | | | | | |
| Opacity | <−17 | <−17 | <−17 | <−17 | −12 | +4 |
| Clarity | | | | | −7 | +6.5 |

TABLE 8-continued

| | Dodecanol (component I) % conc. w/v | | | | | |
|---|---|---|---|---|---|---|
| | 1.25 | 2.5 | 5 | 10 | 20 | 50 |
| Component II | Temp. °C. | | | | | |
| Temp. interval | | | | | 5 | 2.5 |
| 1-Pentanol | | | | | | |
| Opacity | | | | | <−20 | −10.5 |
| Clarity | | | | | | −4 |
| Temp. interval | | | | | | 6.5 |
| 1-Hexanol | | | | | | |
| Opacity | | | | | −23 | −11 |
| Clarity | | | | | −10 | −5 |
| Temp. interval | | | | | 13 | 6 |
| 2-Octanol | | | | | | |
| Opacity | | | | | −23 | −14 |
| Clarity | | | | | | −5 |
| Temp. interval | | | | | | 9 |

TABLE 9

| | n-Decyl alcohol (component I) % conc. w/v | | | | | |
|---|---|---|---|---|---|---|
| | 1.25 | 2.5 | 5 | 10 | 20 | 50 |
| Component II | Temp. °C. | | | | | |
| Methanol | | | | | | |
| Opacity | | | | | <−18 | −18 |
| Clarity | | | | | | −6 |
| Temp. interval | | | | | | 12 |
| Ethanol | | | | | | |
| Opacity | | | | | <−18 | <−18 |
| 1-Propanol | | | | | | |
| Opacity | | | | | <−18 | −18 |
| Clarity | | | | | | −2.5 |
| Temp. interval | | | | | | 16.5 |
| 2-Propanol | | | | | | |
| Opacity | | | | | <−18 | −18 |
| Clarity | | | | | | 3.5 |
| Temp. interval | | | | | | 15.5 |

TABLE 10

| | Cholesterol (component I) % conc. w/v | | | | | |
|---|---|---|---|---|---|---|
| | 1.25 | 2.5 | 5 | 10 | 20 | |
| Component II | Temp. °C. | | | | | |
| 1-Propanol | | | | | | |
| Opacity | <−18 | −7.5 | +12 | +23 | +35 | |
| Clarity | | +13 | +26 | +40 | +55 | |
| Temp. interval | | 20.5 | 14 | 17 | 20 | |
| 2-Propanol | | | | | | |
| Opacity | <−18 | −10 | −4 | +20 | +50 | |
| Clarity | | +11 | +13 | +35 | +65 | |
| Temp. interval | | 21 | 17 | 15 | 15 | |

TABLE 11

| | Benzoic acid (component I) % conc. w/v | | | | | |
|---|---|---|---|---|---|---|
| | 1.25 | 2.5 | 5 | 10 | 20 | |
| Component II | Temp. °C. | | | | | |
| 1-Propanol | | | | | | |
| Opacity | | | | <−20 | ±0 | |
| Clarity | | | | | +11 | |
| Temp. interval | | | | | 11 | |
| 2-Propanol | | | | | | |
| Opacity | | | | <−18 | −12 | |
| Clarity | | | | | +5 | |
| Temp. interval | | | | | 17 | |
| 1-Hexanol | | | | | | |
| Opacity | | | | <−18 | +7 | |
| Clarity | | | | | +21 | |
| Temp. interval | | | | | 14 | |

TABLE 12

| | 1-Naphthol (component I) % conc. w/v | |
|---|---|---|
| | 50 | 60 |
| Component II | Temp. °C. | |
| Methanol | | |
| Opacity | <−20 | −14 |
| Clarity | | +12 |
| Temp. interval | | 26 |
| 2-Propanol | | |
| Opacity | <−20 | −12 |
| Clarity | | +35 |
| Temp. interval | | 47 |

TABLE 13

| | Methanol (component II) % conc. w/v | |
|---|---|---|
| | 25 | 50 |
| Component I | Temp. °C. | |
| n-docecane | | |
| Opacity | −10 | −10 |
| Clarity | −6 | −6 |
| Temp. interval | 4 | 4 |
| n-hexadecane | | |
| Opacity | +17 | +17 |
| Clarity | +25 | +25 |
| Temp. interval | 8 | 8 |
| n-eicosane | | |
| Opacity | +35 | +35 |
| Clarity | +40 | +40 |
| Temp. interval | 5 | 5 |

What is claimed is:

1. A composition having opacity below a selected temperature interval and clarity above the temperature interval, wherein said composition consists essentially of
   (A) at least one component I having a melting point higher than the temperatures in the temperature interval;
   (B) at least one component II in which component I is soluble, said component II having a melting point lower than the temperatures in the temperature interval; and
   (C) at least one surface active agent;
   wherein component I is present in an amount sufficient for the composition to exhibit opacity on cooling and clarity on warming within a temperature range and the temperature range is greater than said temperature interval; and
   wherein said composition has opacity within the temperature range when said surface active agent is absent, and said surface active agent is present in said composition in an amount sufficient to narrow the temperature range within which said composition has opacity to said temperature interval.

2. Composition according to claim 1 wherein said composition has opacity below the temperature interval of +2° C. to +8° C. and clarity above said interval.

3. Composition according to claim 1 wherein said surface active agent is present in an amount such that said composition changes from opacity to clarity or vice versa within a temperature interval of ±0.5° C.

4. Composition according to claim 1 wherein component I is selected from the group consisting of palmitic acid, stearic acid, lauric acid, tripalmitin, trimyristin, cetyl alcohol, stearyl alcohol, dodecanol, n-decyl alcohol, cholesterol, benzoic acid, 1-naphthol, n-dodecane, n-hexadecene and n-eicosane.

5. Composition according to claim 4 wherein component II is selected from the group consisting of methanol, ethanol, 1-propanol, 2-propanol, 1-pentanol, 1-hexanol and 2-octanol.

6. Composition according to claim 5 wherein component I comprises 1.25% (w/v) to 50% (w/v) of said composition.

7. Composition according to claim 6 wherein said temperature range is −24° C. to 66° C.

8. An article of manufacture comprising a sealed compartment containing the composition of claim 1 therein, wherein said compartment has a transparent portion through which said composition is visible.

9. A method of making a composition having regulated occurrence of opacity below a selected temperature range and clarity above the temperature range, said method comprising
   (A) providing at least one component II having a melting point lower than said selected temperature range;
   (B) forming a multiplicity of solutions by adding to component II at least one component I, which is soluble in component II and which has a melting point higher than the selected temperature range, wherein component I is blended with component II in amounts to provide each solution in said multiplicity of solutions with a concentration of component I different from the concentration of component I in each of the other solutions;
   (C) alternately heating and cooling each of said solutions and observing the interval of temperatures within said range of temperatures at which each of said solutions reversibly exhibits opacity and clarity; and
   (D) determining the solution in the multiplicity of solutions that has opacity within the selected temperature range.

10. A method according to claim 9 wherein a surface active agent is added to at least one of said solutions in an amount sufficient to narrow the interval of temperatures at which said solution reversibly exhibits opacity and clarity.

11. A method of determining the interval of temperatures at which a composition reversibly exhibits opacity and clarity, wherein said method comprises
   (A) providing at least one component II having a melting point lower than said temperature interval;
   (B) adding to component II a known amount of at least one component I, which is soluble in component II and which has a melting pont higher than said temperature interval;
   wherein component I is present in an amount sufficient for the composition to exhibit opacity on cooling and clarity on warming within the temperature interval; and
   (C) alternately heating and cooling the resulting composition over a range of temperatures and observing the interval of temperatures, corresponding to the known amount of component I, within which the composition reversibly exhibits opacity and clarity.

12. A method according to claim 11 wherein said composition contains a surface active agent in an amount sufficient to narrow the interval of temperatures at which said solution reversibly exhibits opacity and clarity.

13. A method of making a composition having opacity below a selected temperature interval and clarity above the temperature interval, said method comprising
   (A) selecting a temperature interval at which said composition reversibly exhibits opacity and clarity;
   (B) providing at least one component II having a melting point lower than said temperature interval;
   (C) dissolving in component II an amount of at least one component I, which is soluble in component II and which has a melting point higher than said temperature interval, wherein the amount of component I is sufficient for said composition to exhibit opacity at a temperature within said temperature interval;
   (D) alternately heating and cooling the resulting composition at temperatures corresponding to at least the temperatures in said temperature interval; and
   (E) verifying that said composition exhibits opacity at temperatures below said temperature interval and clarity at temperatures above said temperature interval, and that opacity and clarity are reversible.

14. Method according to claim 13 wherein said method includes the step of providing a surface active agent in said composition in an amount sufficient to narrow the interval of temperatures at which said solution reversibly exhibits opacity and clarity.

15. Method of determining temperature within an interval of temperatures, said method comprising
   (1) providing a composition having regulated occurrence of opacity and clarity at selected temperatures, which composition contains
   (A) at least one substance as component I having a melting point higher with reference to the selected temperatures to be indicated, and
   (B) at least one substance as component II having a melting point lower with reference to the selected temperatures to be indicated;
   wherein component I is soluble in component II and the composition has the property of giving opacity on cooling and clarity on warming, such a reaction occurring reversibly and indicating if pre-set temperature interval limits have been exceeded or fallen below; and
   (2) determining whether said composition has opacity or clarity.

16. A method according to claim 15 wherein a surface active agent is added to said composition in an amount sufficient to narrow the interval of temperatures at which said composition reversibly exhibits opacity and clarity.

17. Method of determining temperature, said method comprising
   (1) providing a composition having regulated occurrence of opacity and clarity at selected temperatures, which composition contains
   (A) at least one substance as component I having a melting point higher with reference to the selected temperatures to be indicated, and
   (B) at least one substance as component II having a melting point lower with reference to the selected temperatures to be indicated;
   wherein component I is soluble in component II and the composition has the property of giving opacity on cooling and clarity on warming, such a reaction occurring reversibly and indicating if pre-set temperature interval limits have been exceeded or fallen below; and
   (2) alternately heating and cooling said composition; and
   (3) determining whether said composition has opacity or clarity.

18. A method according to claim 17 wherein said composition contains a surface active agent in an amount sufficient to narrow the temperature interval at which said solution reversibly exhibits opacity and clarity.

19. Method according to claim 17 which further comprises enclosing said composition in a transparent or translucent container having a background, which makes it possible visually to distinguish the difference between opacity and clarity.

20. An article of manufacture having opacity below a selected temperature interval and clarity above the temperature interval, wherein said article comprises
   (1) a sealed, first compartment containing a composition having regulated occurrrence of opacity and clarity at selected temperatures, which composition contains
   (A) at leat one substance as component I having a melting point higher with reference to the selected temperatures to be indicated, and
   (B) at least one substance as component II having a melting point lower with reference to the selected temperatures to be indicated;
   wherein component I is soluble in component II and the composition has the property of giving opacity on cooling and clarity on warming, such a reaction occurring reversibly and indicating if pre-set temperature interval limits have been exceeded or fallen below; and
   wherein the composition in said first compartment has clarity and said first compartment has a transparent portion through which said composition is visible; and
   (2) a sealed, second compartment containing a composition which is the same as the composition in the first compartment, except that the composition in said second compartment has opacity, and wherein said second compartment has a transparent portion through which said composition is visible.

21. An article of manufacture comprising
an elongated, sealed container containing a composition having regulated occurrence of opacity and clarity at selected temperatures, which composition contains
   (A) at least one substance as component I having a melting point higher with reference to the selected temperatures to be indicated, and
   (B) at least one substance as component II having a melting point lower with reference to the selected temperatures to be indicated;
   wherein component I is soluble in component II and the composition has the property of giving opacity on cooling and clarity on warming, such a reaction occurring reversibly and indicating if pre-set temperature interval limits have been exceeded or fallen below; and
   wherein said container has at least one portion at a first temperature within the temperature interval and the composition has opacity at the first temperature, and at least one other portion at a second temperature above the temperature interval and the composition has clarity at the second temperature.

* * * * *